April 15, 1958     W. R. BAILEY     2,830,926
METHOD OF FEEDING WEBS OF GLASS FIBER
Filed Dec. 24, 1954     3 Sheets-Sheet 1
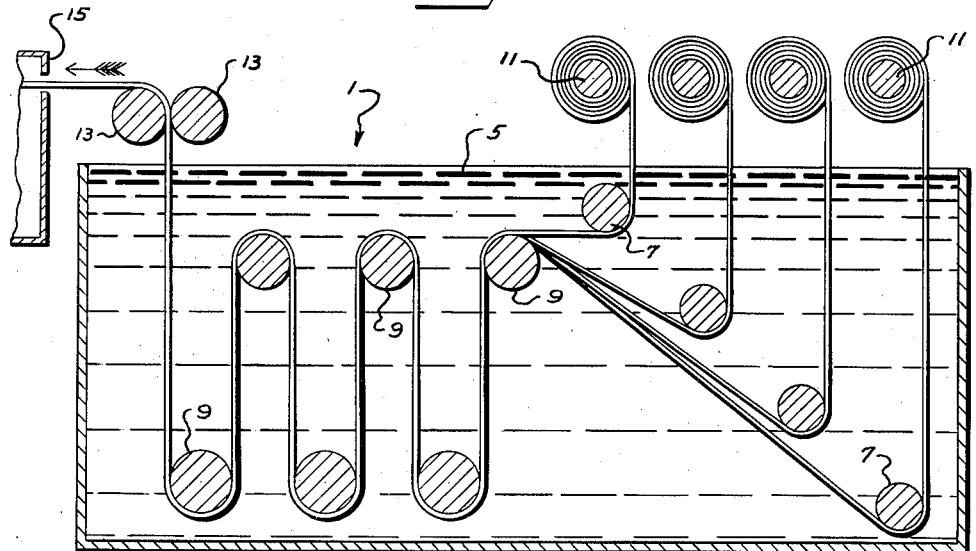
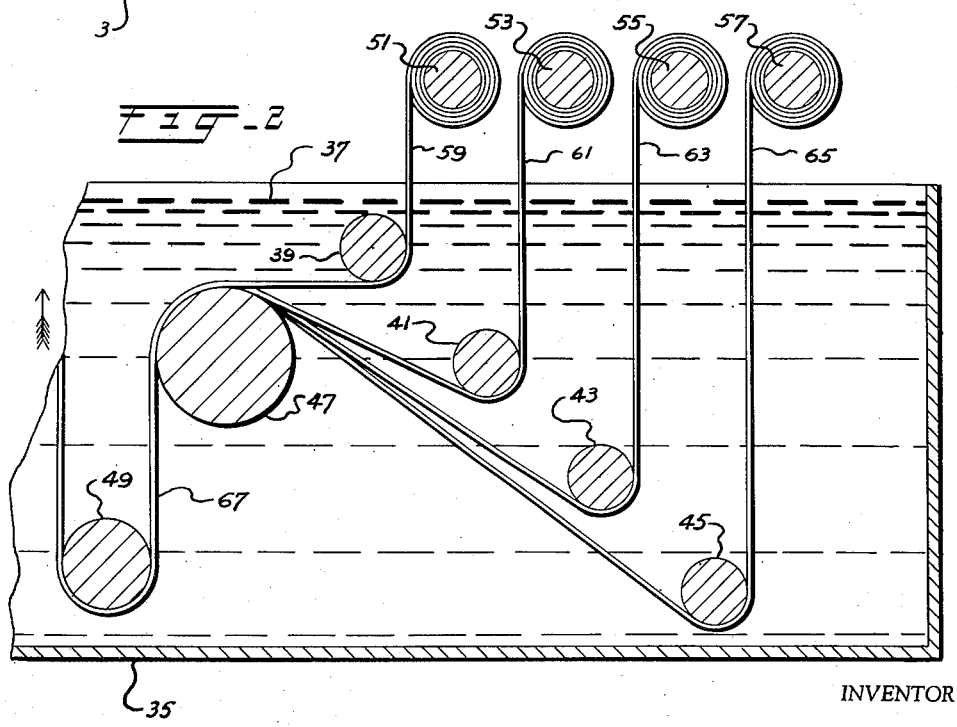
INVENTOR
WILLIAM RUSSELL BAILEY
BY *Townsend F. Beaman*
ATTORNEY

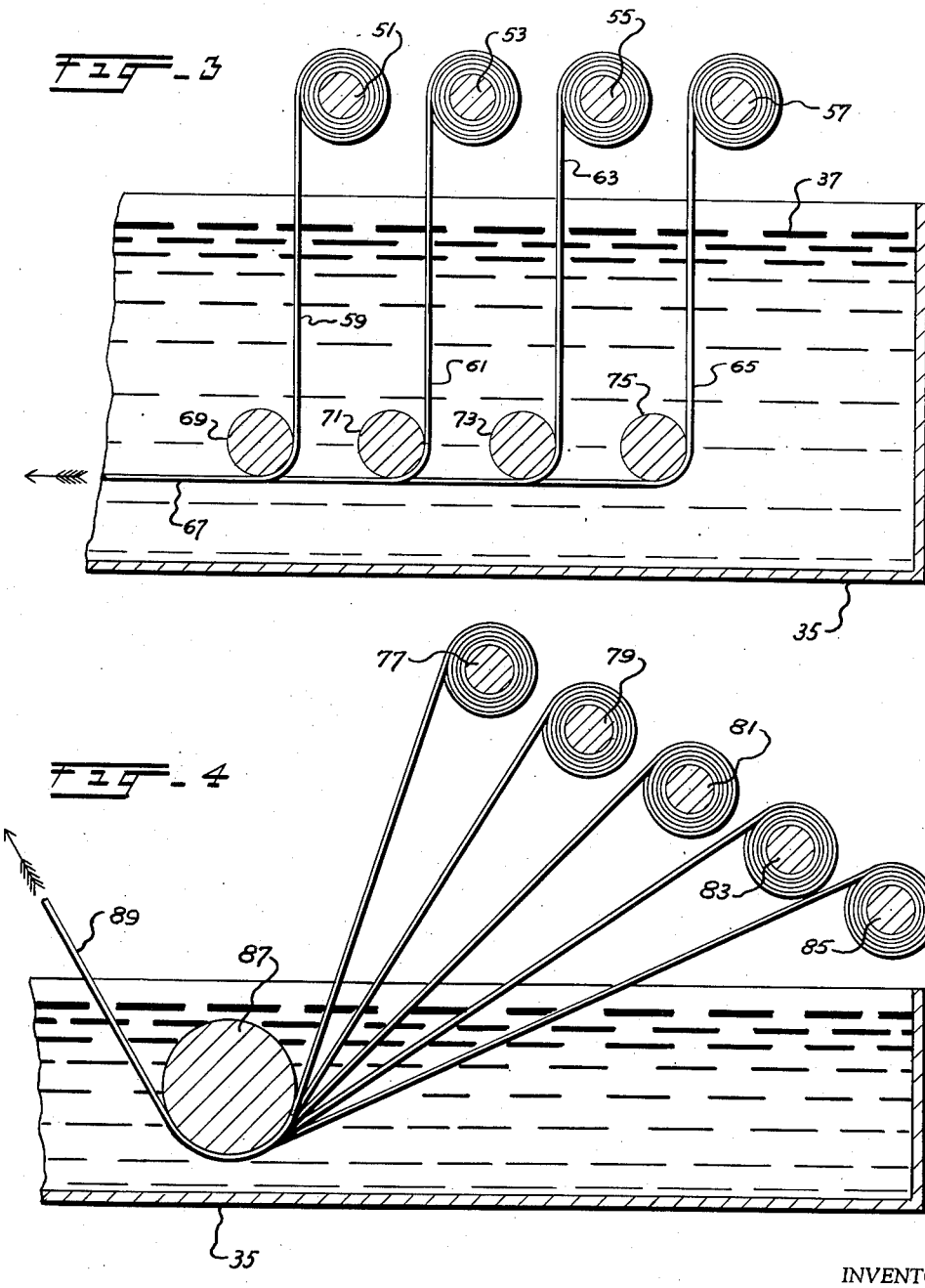

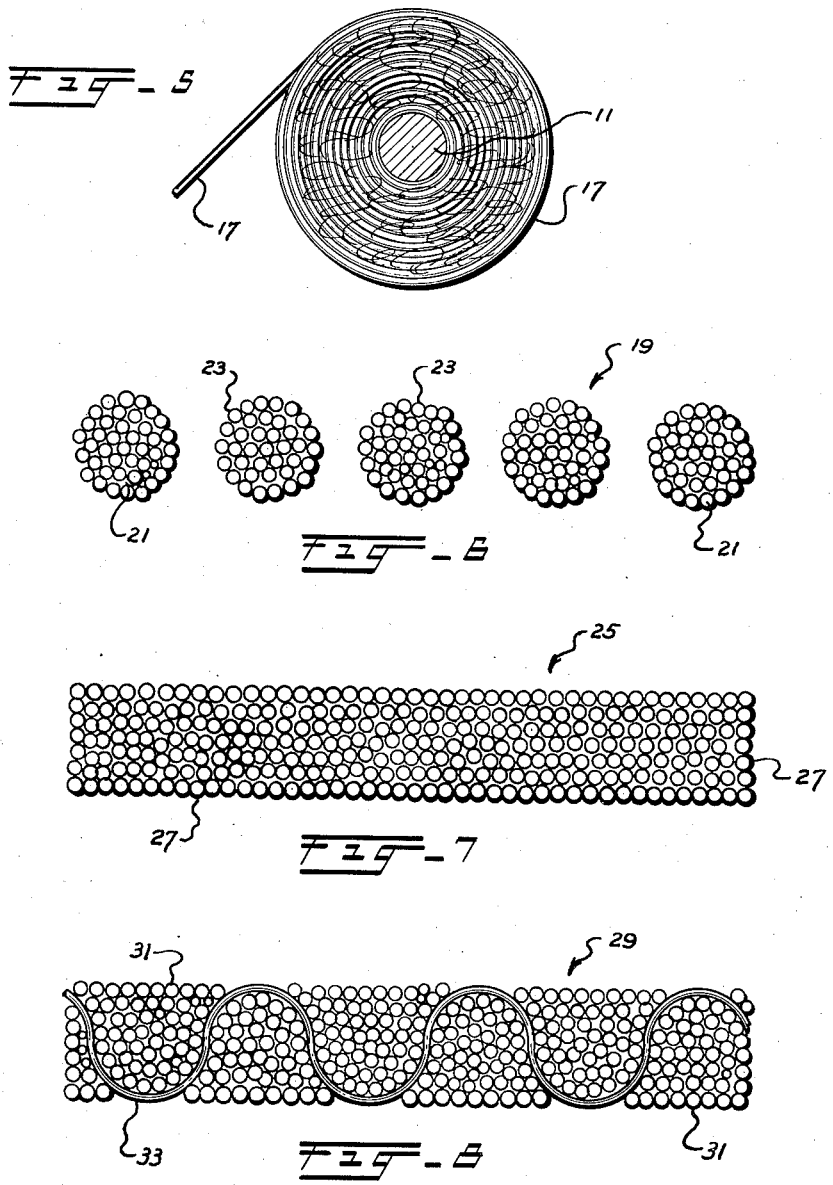

United States Patent Office 2,830,926
Patented Apr. 15, 1958

2,830,926

METHOD OF FEEDING WEBS OF GLASS FIBER

William Russell Bailey, Washington, D. C., assignor to Gar Wood Industries, Wayne, Mich.

Application December 24, 1954, Serial No. 477,508

1 Claim. (Cl. 154—128)

The present invention relates to new and improved method and apparatus for feeding webs, and more particularly to new and improved method and apparatus for immersing webs of glass fibers in a bath of liquid plastic.

Heretofore, the art of impregnating glass fibers with plastics such as resin has been greatly troubled by the entrapment of air within the bundles of glass fibers entering the resin bath. Such entrapped air would be carried into the bath in the entering web of glass fiber and would be sealed in the interior of the web or body of glass fiber by the resin as it impregnated the body of glass fibre. Upon curing at an elevated temperature, the air within the plastic would expand, causing marked weakening of the final bonded product, and in some cases, actual distortion of the product. Moreover, an impregnated glass fiber article including entrapped air was unsightly in that it had a bubbled or mottled appearance. Often, the entrapped air would give the cloudy effect of windshield glass that has "bloomed."

In an effort to remove the air entrapped in the body of glass fiber in the resin bath, it was proposed to squeeze the body of impregnated glass fiber between pinch rolls or the like, in an effort to drive out the air bubbles in the same way that water is driven from clothes run through the wringer of a washing machine. However, it was found in practice that the air was not driven outwardly to the outer surface of the bundle of glass fibers where it might pass off in the form of bubbles; but rather, the unimpregnated central portion of the bundle of glass fibers offered less resistance to the passage of the air than did the impregnated outer portion of the bundle of glass fibers, with the result that the air merely passed rearward through the glass fibers longitudinally thereof, without coming to the surface of the bundle of fibers. The effect of this was greatly to elongate the air bubble within the bundle of glass fiber. Actually, such squeezing decreased the strength of the final product rather than increasing it, since the area of weakness occasioned by the presence of included air was actually increased by such pressure.

It was also proposed to raise the temperature of the bath above that temperature which would ordinarily be maintained, in an effort to decrease the viscosity of the bath of plastic such as resin to such a point that air bubbles within the bundle of glass fiber could more readily move outward and rise through the bath as bubbles. However, it was found that when the temperature of the bath was raised much above that temperature which would give a workable viscosity without regard to the inclusion of air, the bath itself began to produce bubbles which would find their way into the bundle of glass fibers. This phenomenon of bubbling within the bath below the boiling point thereof apparently was due to decomposition or disassociation of certain constituents of the bath; but whatever the cause of the bubbling, it rendered worse than useless the attempt to remove entrapped air in this manner.

Although many attempts were made to overcome the foregoing difficulties and other disadvantages, none, as far as I am aware, was entirely successful when carried into practice commercially on an industrial scale.

Accordingly, it is an object of the present invention to provide a method and apparatus for reducing the quantity of air entrapped in a body of glass fibers impregnated with a plastic.

Another object of the invention is to provide a method and apparatus for immersing webs of glass fibers within baths in such a way as to draw a minimum of air beneath the surface of the bath with the fibers.

The invention also contemplates providing a method and apparatus for feeding webs of glass fiber through a bath, in which the speed of web travel can be substantially increased without undue inclusions of air in the body of the impregnated fibers.

Finally, it is an object of the present invention to provide a method of web feeding that will be easy and economical to practice and to provide an apparatus for web feeding that will be economical to construct and operate.

Other objects and advantages will become apparent from the following description taken in conjunction with the accompanying drawings, in which:

Figure 1 is a diagrammatic view in sectional elevation illustrating the overall method and apparatus for practicing my invention;

Figure 2 depicts in partial sectional elevation a diagrammatic view of one embodiment of method and apparatus for initial treatment of the webs within the bath;

Figure 3 shows another embodiment of method and apparatus according to my invention, viewed as in Figure 2;

Figure 4 shows still another embdoiment of method and apparatus according to my invention, viewed as in Figures 2 and 3;

Figure 5 is a side elevational view of a feed roll assembly;

Figure 6 is a diagrammatic cross-section view of one embodiment of glass fiber web useful in the practice of my invention;

Figure 7 is a cross-sectional view of another embodiment of glass fiber web useful in the practice of my invention; and Figure 8 is a third embodiment, shown diagrammatically in cross-section, of glass fiber web useful in the practice of my invention.

Referring now to the drawings in greater detail, it will be seen by an inspection of Figure 1 that I have provided a bath 1 comprising a tank 3 filled with plastic such as resin in liquid form, the liquid having a surface or liquid line 5 adjacent the top of the tank. A plurality of diagonally spaced rollers 7 are mounted in tank 3 between the side walls thereof. Rollers 7 are shown in Figure 1 to be four in number and to extend diagonally downward to the right, as seen in Figure 1. Rollers 7 may be idle rollers or power-driven rollers. Also mounted within the tank is a series of reeving rollers 9, laterally spaced in vertically staggered relationship.

Above the bath is positioned a plurality of laterally spaced feed rollers 11, shown in Figure 1 to be four in number. Feed rollers 11 may be idle or power-driven; and it will be noted that each feed roller 11 is spaced substantially vertically above a corresponding roller 7. Above the other side of tank 3 from feed rollers 11 is a pair of pinch rollers 13. As seen in Figure 1, the right hand pinch roller 13 is adapted to rotate in a clockwise direction; while the left hand pinch roller 13 is adapted to rotate in a counterclockwise direction. Rollers 13 may be idle rollers; but it is preferred that they be power-driven. To the left of pinch rollers 13, as seen in Figure 1, is a curing chamber or oven 15.

Skipping now to Figures 5 through 8, the nature of the material wound on feed rollers 11 will become apparent. In Figure 5, the material on roller 11 is lined to show glass fiber, comprising in this instance tape or ribbon or web 17 of a plurality of very fine glass fibers disposed longitudinally of the web and running continuously therealong. Thus, web 17 will be seen to comprise a flat ribbon which may be of any width, but which in practice will ordinarily run between 5 and 50 inches in width.

In Figure 6, I have shown a diagrammatic cross-sectional view of one form the web may take. In that figure, I have shown glass roving 19. "Roving" is a term of the glass fiber art denoting a plurality of bundles of glass fibers. In Figure 6, the bundles 21 are each comprised of a plurality of filaments 23, the glass fiber filaments having a thickness of about 0.00020 or 0.00025 inch. Thus, it will be appreciated that Figure 6 is greatly enlarged from actual size, as are also Figures 8 and 7. Moreover, the individual filaments, Figs. 6 through 8, have not been lined to show a cross-section of glass, in order to avoid a confusing multiplicity of short lines. In Figure 6, it will be noted that the bundles 21 comprising roving 19 are arranged substantially side-by-side so as to form a flat web. It will, however, be of course appreciated that in a web comprised of roving, it is not necessary that the bundles be precisely lined up side-by-side, but only that they be disposed in such a way as to give a flat web of the desired width and thickness.

I have shown in Figure 7 another embodiment of glass fiber suitable for the web of my invention. In that figure, I have shown a uni-directional tape 25 comprised of individual filaments 27. "Uni-directional tape" is a term of the glass fiber art denoting a relatively broad, flat mass of glass fibers running longitudinally of the tape, with no particular distribution of the fibers as in the case of roving. Thus, uni-directional tape to the eye has the appearance of a shiny white ribbon.

In Figure 8, I have shown still another embodiment of web adaptable to my invention, in diagrammatic cross-section, greatly enlarged. In that figure, I have shown uni-directional cloth 29 comprised of a great multiplicity of filaments 31 held together laterally by an occasional cross filament 33. "Uni-directional cloth" is a term of the glass fiber art denoting a material very much like the uni-directional tape, but in which an occasional cross filament has been woven to give the cloth a greater measure of lateral stability. In this cloth, the vast majority of the filaments run continuously longitudinally of the cloth, so that the physical characteristics of the cloth, both before and after impregnation with plastic such as resin, remain substantially the same.

Thus, returning to Figure 2, it will be seen that I have there provided an exemplary embodiment of my invention comprising a tank 35 filled with liquid plastic such as resin having a liquid line 37. Four diagonally spaced rollers 39, 41, 43 and 45 are mounted for rotation between the side walls of tank 35; and first and second reeving rollers 47 and 49 are also mounted rotatably between the side walls of the tank. Mounted rotatably above the tank are four feed rollers 51, 53, 55 and 57, having wound thereon webs 59, 61, 63 and 65, respectively, of glass fibers comprising glass filaments running continuously longitudinally of the webs. It will be noted in Figure 2 that as each web is fed off its respective feed roller, it is drawn vertically downward beneath surface 37 of the bath and about its respective diagonally spaced roller 39, 41, 43 or 45. It will also be noted that the webs all enter the bath perpendicular to surface 37 and are spaced apart laterally from each other.

After leaving the diagonally spaced rollers, the webs are drawn together over first reeving roller 47 to form a composite bundle or body 67 comprised of the total of all the glass fibers which were fed into the bath. Body 67 then passes beneath second reeving roller 49, and so on through and out of the bath as in Figure 1.

In Figure 3, I have shown another modification of method and apparatus according to my invention, in which instead of diagonally spaced rollers, laterally spaced horizontally coplanar rollers 69, 71, 73 and 75 are rotatably mounted between the side walls of tank 35. Thus, the webs descending vertically from their respective feed rollers will pass about these horizontally coplanar rollers within the bath and join one by one to form composite 67 moving off to the left as seen in Figure 3.

Figure 4 depicts still another modification of method and apparatus according to my invention, in which a plurality of feed rollers 77, 79, 81, 83 and 85 are disposed above tank 35 and feed to a common reeving roller 87 rotatably mounted within the tank between the side walls thereof, to form a composite 89 comprised of the five original webs superposed, moving out of the bath upwardly to the left as seen in Figure 4. Thus, in the embodiment of Figure 4, it will be noted that the individual webs fed from the feed roller cannot remain in parallelism to each other, as they are converging on reeving roller 87. By the same token, the individual webs cannot enter the bath all perpendicular to the surface thereof. If one web is perpendicular to the surface of the bath, the others will not be. Nevertheless, it is important to note that in the embodiment of Figure 4, the webs enter the bath spaced apart from each other, and do not come into close adjacency and ultimate contact until adjacent reeving roller 87, beneath the surface of the bath.

Thus, as the separate webs are fed into the bath according to any illustrated embodiment of my invention, or other embodiments which will be obvious to those skilled in the art, it will be noted that each web entering the bath has only a small fraction of the thickness of the composite web comprising the desired quantity of glass fiber in the finished article. Now the amount of entrapped air which will be carried into the bath by an entering web of glass fibers is a function of the cross-sectional area of the web and of the total surface of the web exposed. That is to say that the liquid of the bath moves inward from the surface of the web, driving the air before it, under the influence of the liquid pressure and the capillarity of the glass fibers, at a rate which decreases the farther the liquid travels inward from the surface, but which rate is substantially constant per unit distance inward of the surface, regardless of the total thickness of the web.

Thus, a round bundle of glass fibers would entrap the greatest quantity of air for its cross-sectional area of any cross-sectional shape of glass fiber, since the cross-sectional area of a round bundle is the maximum per unit of surface area. As the round bundle is flattened and the surface area increased relative to the cross-sectional area, the amount of entrapped air decreases with no decrease in cross-sectional area.

Thus, it will be seen that I have greatly increased the surface area of my total web entering the bath, without in the least increasing the total cross-sectional area of my total web entering the bath, by splitting my total web into a plurality of flat webs and by feeding each such sectional flat web separately into the bath. It will also be noted that I have maintained this web division until after the fractional webs have passed beneath the surface of the bath. Then, when there is no longer any opportunity for further air to be entrapped, it will be noted that I reassemble my fractional webs into a total web, beneath the surface of the bath.

Thus, it will be seen that I can reassemble the separate webs in tension over a common reel or roller without fear of entrapping further air and so as to produce a homogeneous composite of all the fractional webs lying in superposed position.

It will also be noted that I have provided pinch rollers for pressing the composite web as it leaves the bath, for the purpose of driving out excess bath liquid before the web passes into the curing chamber or oven, which excess liquid falls back into the bath.

It should also be noted that in all embodiments illustrated except one, I have provided for perpendicular entry of the fractional webs into the bath, as I have noted that less air is entrapped in the webs if they enter the bath perpendicular to its surface than if they enter at an angle thereto.

It should finally be noted that I have maintained substantial spacing between my fractional webs as they enter the bath, and that they are spaced apart substantial distances at their points of entry into the bath, since I have found that rapidly moving multiple webs in too close adjacency at their points of entry into the bath may tend to entrap more air than if the fractional webs are spaced substantial distances from each other.

Thus, it will be obvious that I have provided a method and apparatus for introducing glass fiber into a bath in such a way as to effect great reductions in the quantity of air entrapped within the final web emerging from the bath. It will also be obvious that I have provided a method and apparatus in which glass fiber may be fed into a bath at a much greater linear velocity than was heretofore possible without entrapping unduly great quantities of air in the completed glass fiber article.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

I claim:

A method of reducing the quantity of air entrapped in a relatively thick, flat body of glass fibers impregnated with resin, which comprises feeding a plurality of relatively thin, flat webs each comprised of a plurality of continuous glass fibers disposed longitudinally of said webs, into a bath of liquid resin, said relatively thin webs being spaced apart at their points of entry into said bath and substantially perpendicular to the surface of said bath adjacent said points of entry, and passing said relatively thin webs in superposed relationship in tension and in contact with each other about at least a portion of the cylindrical surface of a roller in said bath to press said relatively thin webs together and to cause individual glass fibers of said relatively thin webs to shift relative to each other radially of the cylindrical surface of the roller so as to interfit with glass fibers of adjacent relatively thin webs, thereby to form a relatively thick, flat body of glass fibers impregnated with resin and having the glass fibers and the resin uniformly distributed throughout the thickness of the body.

References Cited in the file of this patent

UNITED STATES PATENTS

| | | |
|---|---|---|
| 312,451 | Ehret | Feb. 17, 1885 |
| 2,402,653 | Clark | June 25, 1946 |
| 2,552,124 | Tallman | May 8, 1951 |
| 2,625,498 | Koch | Jan. 13, 1953 |
| 2,640,799 | Grangaard | June 2, 1953 |
| 2,664,801 | Eisbein | Jan. 5, 1954 |
| 2,684,318 | Meek | July 20, 1954 |

FOREIGN PATENTS

| | | |
|---|---|---|
| 127,382 | Great Britain | May 22, 1919 |